O. RICE.
AIR CONTROL MECHANISM FOR CARBURETERS.
APPLICATION FILED OCT. 18, 1916.

1,337,326.

Patented Apr. 20, 1920.

Witness
E. R. Pollard

Inventor.
Orrin Rice.
By Cassell Severance
Attorney.

UNITED STATES PATENT OFFICE.

ORRIN RICE, OF LOS ANGELES, CALIFORNIA, ASSIGNOR, BY DIRECT AND MESNE ASSIGNMENTS, TO U. S. GRANT HINTON, OF PROVIDENCE, RHODE ISLAND.

AIR-CONTROL MECHANISM FOR CARBURETERS.

1,337,326. Specification of Letters Patent. Patented Apr. 20, 1920.

Application filed October 18, 1916. Serial No. 126,399.

*To all whom it may concern:*

Be it known that I, ORRIN RICE, a citizen of the United States, residing at Los Angeles, in the county of Los Angeles and State of California, have invented certain new and useful Improvements in Air-Control Mechanisms for Carbureters, of which the following is a specification.

This invention relates to improvements in air control mechanisms for carbureters and has particular relation to means adapted to be interposed in the hot air or other air inlet pipe used on certain vehicles for delivering air to the carburetor of the vehicle engine.

It is an object of the invention to provide an automatic air controlling mechanism for inlet pipes used for directing air to the intake of a carbureter.

It is also an object of the invention to provide as a new article of manufacture, a detachable throttle mechanism adapted to be removably inserted in air pipes leading to the intake of a carbureter.

It is a still further object of the invention to provide a detachable valve mechanism adapted to be inserted in the hot air pipes used with many vehicle carbureters, and which delivers warm or heated air taken from around the exhaust pipe of the engine, directing it to the air intake of the carbureter.

It is a still further object of the invention to provide a new article of manufacture having a casing adapted to fit in the hot air pipe connected with a carbureter, the said casing having a hinged valve therein which is actuated by a weight or its equivalent, a spring, for automatically controlling the heated air delivered to the carbureter.

With these and other objects in view, the invention comprises certain novel constructions, combinations, and arrangements of parts, as will be hereinafter more fully described and claimed.

In the accompanying drawing forming a part of this specification;

Figure 1 is a side elevation of a portion of a vehicle engine showing parts of the intake, and exhaust manifolds, and the carbureter connected with the intake manifold; a hot air pipe being also shown for delivering heated air from the exhaust manifold to the carbureter, a portion of the said pipe and of adjacent parts of the carbureter being broken away and shown in section, to illustrate the automatic throttle mechanism in place within said pipe.

There are a number of motor vehicles in which warm or heated air is supplied to the air inlet of the engine carburetor, and there are many of these vehicles which employ a pipe having one end flaring and extending over a portion of the exhaust pipe or manifold, while the other end thereof is inserted in the air intake opening of the carbureter, so that heated air is thus supplied to the carbureter for increasing the efficiency of the gaseous mixtures, which the carbureter delivers to the engine. It is the purpose of this invention to provide a controlling means which can be removably mounted in said pipe for automatically controlling the supply of heated air to the carbureter in accordance with the action of the engine. The device is a detachable one which can be readily inserted in the hot air pipes of many vehicles, which do not come equipped with any air controlling means for the carbureter.

Figure 1:
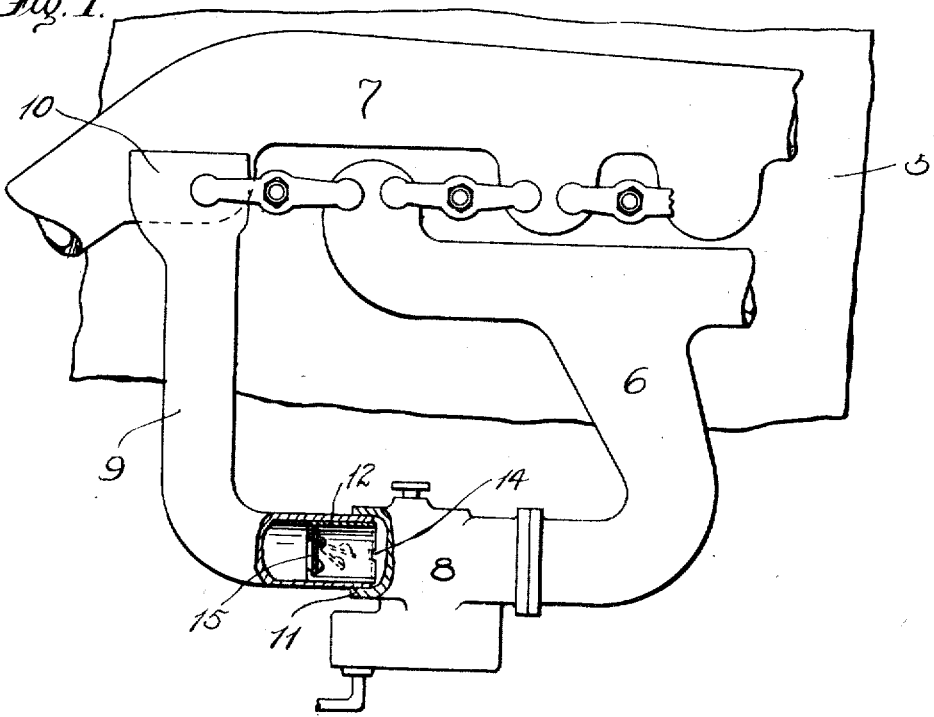
Figure 3:
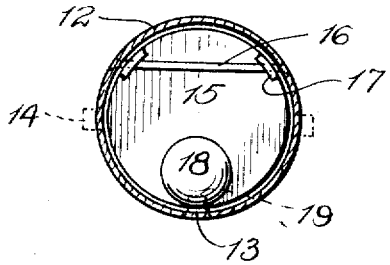
Fig. 3 is a transverse sectional view through the same, and looking at the inside of the valve.
Figure 4:
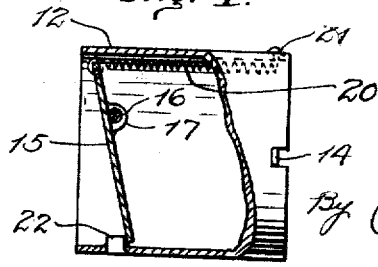
Fig. 4 is a longitudinal sectional view through a modified form of the device, the weight upon the valve being replaced by its equivalent, a spring.

The details and features of the invention will now be more specifically described, reference being had to the accompanying drawing, in which 5 indicates an automobile engine, 6 the intake manifold, 7 the exhaust manifold, and 8 the carbureter of an ordinary motor vehicle, such for instance, as is commonly known as the Ford automobile. In many styles of automobiles, the action of the carbureter is improved by the supplying of heated air to the carbureter intake. Thus as shown in the drawing, a hot air pipe 9 is used upon the type of vehicle shown, one end being flared outwardly at 10, and clamped against the exhaust manifold 7 in any suitable manner, so that all air drawn in the end of the pipe will be taken from the hot surface of the said manifold and will thus be highly heated. The other end of the pipe 9 is inserted in the inlet opening 11 of the carbureter. The improved device of the present invention comprises a casing 12 usually cylindrical, so as to be easily inserted in the end of the hot air pipe 9 as shown in Fig. 1 of the drawing. This cylinder 12 may be split as at 13, and made with a slight springing action so that it will tend to spring outwardly to a slight extent when thrust into the end of the pipe 9. The attachment is thus frictionally held in the pipe, and yet is readily removable if desired. Detents 14 are struck outwardly from the metal of the casing 12 to form limiting stops for preventing the insertion of the device too far in the pipe. Within the casing 12 is a throttle valve 15, preferably comprising a disk, or other valve shaped piece of metal approximately fitting the contour of the said casing 12, but so loose that it will move freely therein. The said valve 15 is pivotally swung in any desired manner, and may be arranged as shown upon a rod or shaft 16, which passes through eyes 17 formed upon the valve, and has its ends secured in the walls of the casing 12, as clearly shown in Fig. 3 of the drawing.

Figure 2:
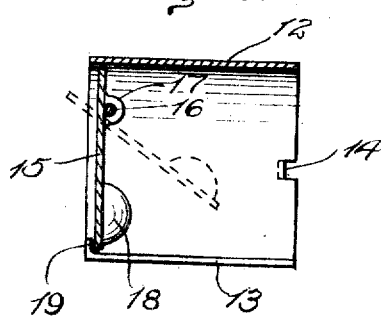
Fig. 2 is an enlarged longitudinal sectional view through the air controlled mechanism of the present invention showing the throttle valve weighted.

The automatic action of the valve 15 is facilitated by a proper weighting of the lower portion of the valve. Thus as shown in Fig. 2, a weight 18 is placed upon the said valve near its lower edges. A stop 19 at the bottom of the casing limits the outward movement of the weighted portion of the valve. Instead of using the weight 18 at the lower part of the valve, a light spring 20 may be applied to the upper portion of said valve above the shaft 16, one end of which is connected with the valve while the other is secured at 21 to the casing. The stop for said valve may also be set inwardly from the end of the casing 21 as indicated at 22, in order to hold the valve in a slightly inclined position.

The detachable throttle mechanism as above described is easily inserted in the pipe 9, the pipe being first loosened from the carbureter, after which it is replaced again. The air entering through the hot air pipe is thus automatically regulated. By the use of the device, the motor vehicle can be throttled down to a very slow speed on the high gear, and it is found that the vehicle when using this device can be more readily accelerated and will start easier and climb hills better than when the attachment is taken out of the pipe. A material saving of fuel is also effected.

It will be readily understood that this device may be inserted in the hot air pipe of any vehicle where the heated air is delivered to the carbureter, whether the device is equipped with any controlling means or not. In some of the more common types of cars, such as for instance, as the Ford, the carbureter is provided with a hot air pipe as 9, and the action of the motor can be very much improved by disconnecting the pipe 9, and inserting the air controlled device as above described. It will be evident that the size of the casing and the valve may be altered for use in hot air pipes of any size within the spirit and scope of the invention. It will also be seen that the air controlled device may be inserted in the inlet air passage of any carbureter on any type of automobile in which the casing will fit. The action of the throttle valve mounted in the casing is entirely automatic. When the engine is throttled down, the weight or spring will tend to prevent the entrance of any excess of air, permitting a sufficient amount to pass through the carbureter for keeping the engine running. When the engine is accelerated, the readily movable throttle will open more and more permitting an ample supply of air to be drawn in, and not interfering in any way with the introduction of air in sufficient quantities for the high speeds of which the engine is capable.

What is claimed is:

1. In combination with a carbureter and an air supply pipe connected thereto, a gas saver comprising a shell adapted to be inserted bodily into said air pipe at its connection with said carbureter, means for limiting the distance said shell can be inserted into the end of said pipe, a valve member pivoted transversely across said shell and wholly within the same, whereby to substantially close the passageway through said shell, and spring means to normally hold said valve closed.

2. A gas saver adapted for use in a carbureter, having an intake pipe embodying a shell insertible into said intake pipe and having means formed therewith for holding it in place in the intake pipe, a valve placed transversely across the interior of the shell substantially closing the passageway therethrough, and means normally to hold said valve closed.

3. A gas saver adapted for use in a carbureter, having an air intake pipe, embodying a shell insertible into said intake pipe, means for limiting the distance the shell can be inserted into the air intake pipe, a valve placed transversely across the interior of the shell substantially closing the passageway therethrough, and means normally to hold said valve closed.

4. A gas saver adapted for use in a carbureter, having an air intake pipe, embodying a shell insertible into said intake pipe, the shell being split longitudinally and resiliently expansive to expand in the intake pipe and thus hold itself in place, means for limiting the distance the shell can be inserted into the air intake pipe, a valve placed transversely across the interior of the shell substantially closing the passageway therethrough, and means normally to hold said valve closed.

In testimony whereof, I have hereunto set my hand, in presence of two witnesses.

ORRIN RICE.

Witnesses:
D. P. KENDRICK,
J. H. STRINE.